United States Patent [19]

Meacham

[11] Patent Number: 4,967,230
[45] Date of Patent: Oct. 30, 1990

[54] REGISTRATION SYSTEM FOR LIGHT EXPOSURE APPARATUS

[75] Inventor: G. B. Kirby Meacham, Shaker Heights, Ohio

[73] Assignee: nuArc Company, Inc., Niles, Ill.

[21] Appl. No.: 407,809

[22] Filed: Sep. 19, 1989

[51] Int. Cl.⁵ ............................................. G03B 27/02
[52] U.S. Cl. ...................................... 355/91; 355/128
[58] Field of Search ...................... 355/78, 79, 91, 99, 355/102, 104, 109, 117, 92–94, 128–130

[56] References Cited

U.S. PATENT DOCUMENTS

4,664,511  5/1987  Carlson et al. ........................ 355/91

Primary Examiner—L. T. Hix
Assistant Examiner—D. Rutledge
Attorney, Agent, or Firm—Mason, Kolehmainen, Rathburn & Wyss

[57] ABSTRACT

A registration system for exposing photosensitive sheets to controlled light through images formed on film includes a thin, relatively stiff, dimensionally stable support board having a relatively flat upper surface for supporting a photosensitive sheet and an image forming film sheet in overlying relation thereon including an upper layer formed of resilient material and having at least one registration opening extending between opposite faces of the board for receiving a registration pin. The pin includes a stop flange adjacent a lower end for limiting upward movement of the pin in the board and includes an upper body normally projecting above the upper surface of the support board to extend into aligned registration openings which are punched in the photosensitive sheet and the image forming film. Each opening has a diameter in the upper layer of the board that is slightly less than the diameter of the pin and the resilient material around the opening holds the pin in the board even after extended use and wear causes the pin to fit loosely in a lower layer of the registration opening.

28 Claims, 4 Drawing Sheets

REGISTRATION SYSTEM FOR LIGHT EXPOSURE APPARATUS

BACKGROUND OF THE INVENTION

1. Field of the Invention

The present invention relates to a new and improved registration system for light exposure units of the type utilized for exposing photosensitive sheets to controlled light through image forming film sheets for reproducing images. More particularly, the present invention is especially useful in multi-color copy making operations wherein a plurality of different photosensitive sheets and image forming film sheets are needed and wherein precise registration is required in order to accurately reproduce precision color images in three and four color printing operations.

2. Background of the Prior Art

In copy making and platemaking operations where precise registration is required between one or more image forming films and presensitive sheets, especially in three and four color operations, fast draw-down type vacuum blankets have been utilized. One such vacuum blanket system is shown and described in copending U.S. patent application Ser. No. 353,055, filed May 17, 1989, assigned to the same assignee as the present application and incorporated herein by reference. Because these vacuum blankets operate by using nonuniform clamping force distribution to induce air flow channels in the film media, the forced distribution of air propagates along thin, sheet-like inserts commonly known as a "Carlson" boards which are inserted between the vacuum blanket and the film sheets. With a relatively thin, stiff, "Carlson" board, the fast draw-down vacuum blanket is extremely effective. However, when relatively thick "Carlson" boards are utilized, collapsible registration pins are needed and because the "Carlson" board is relatively stiff and thick, and the fast draw-down action may be lost. Registration pins are required to provide precise registration between successive or multiple image forming films and one or more photosensitive media sheets on which images are to be reproduced. As wear occurs in a "Carlson" board, the registration pins begin to fit loosely in the registration holes provided in the Carlson board and the pins tend to fall out during handling and copy making operations. This problem causes delays in production and in addition, results in imprecise registration because the worn pins may begin to tilt or move slightly as the relatively thin supporting surface around the registration opening in a "Carlson" board becomes worn. The tilting or movement of a registration pin results in imprecise registration between successive image forming films and presensitized sheets.

OBJECTS OF THE INNVENTION

Accordingly, it is an object of the present invention to provide a new and improved registration system for light exposure units and more particularly a new and improved apparatus for exposing photosensitive sheets to light through an image forming films to reproduce images thereon.

It is another object of the present invention to provide a new and improved exposure unit of the character described which employs a new and improved support board having at least one registration pin mounted therein for providing precise registration between image forming film sheets and photosensitive sheets used in copy making and platemaking operations.

More particularly, it is an object of the present invention to provide a new and improved apparatus of the character described wherein a new and improved "Carlson" type support board is utilized having an upper section or layer formed of relatively resilient material for continuously gripping a registration pin inserted in a punched opening so that the pin does not drop out inadvertently or tilt as wear occurs.

Another object of the present invention is to provide a new and improved support board formed of elastomeric material having a registration opening that is slightly smaller in diameter than the nominal diameter of a registration pin so that the pin is continuously gripped by resilient contact from the board material and does not fall out or tilt when board and pin wear occurs.

Another object of the present invention is to provide a new and improved support board for use in copy making apparatus of the character described wherein the support board comprises an upper layer of relatively resilient material bonded to a lower layer formed of relatively stiff material.

Another object of the present invention is to provide a new and improved apparatus of the character described wherein punched registration holes are coaxially formed in both layers of a support board in a single punch-out operation and wherein the portion of the hole within an upper resilient layer of the board has a smaller diameter than the diameter in a lower portion of the board which formed of relatively rigid or stiff material whereby a registration pin is firmly held in the board even though the pin becomes loosely movable in the larger diameter bore provided in the lower rigid layer.

Another object of the present invention is to provide a new and improved registration system of the character described wherein a registration opening is punched-out in one or more photosensitive sheets and image forming films with the same punch and die used for making a registration opening in a support board for a registration pin.

Another object of the invention is to provide a new and improved registration system of the character described which is easy to use and which may be rapidly set up for multi-color platemaking and copy making operations resulting in greatly improved production rates with a minimum of time lost because of registration pins fitting too loosely or falling out of a "Carlson" type board.

BRIEF SUMMARY OF THE INVENTION

The foregoing and other objects and advantages of the present invention are accomplished in a new and improved illustrated embodiment comprising a registration system for light exposure units of the type used for exposing photosensitive sheets to contolled light through image forming films to reproduce images. The system includes a relatively thin, stiff, dimensionally stable support board having a flat upper surface for supporting a sheet of photosensitive media an image producing and film in overlying relation. The support board has a flat bottom surface adapted to lay on a vacuum blanket of the exposure unit. The support board includes an upper layer or section formed of relatively resilient material having at least one registration opening punched-out and extending between the upper and lower surfaces of the board for receiving a registration pin to align the film sheets in precise registration for exposure. A lower section of the board is formed of relatively stiff material, and a registration pin is inserted into each opening in the support board to protrude upwardly from the resilient upper surface and provide a locator pin for engaging registration openings that are punched-out in the film sheets.

Each registration pin includes a stop flange adjacent a lower end for limiting upward movement in the support board. An upper body portion of the pin projects a short distance above the upper surface of the resilient layer of the support board. The registration opening formed in the resilient layer or section of the support board is slightly smaller in diameter than the diameter of the registration pin body, and the lower portion of the registration opening in the lower rigid section of the support board has a larger diameter so that the pins are easily inserted from the bottom of the board but are positively retained in the support board by the reslilent gripping action of the upper layer.

When wear occurs on the pins and in the lower, relatively rigid, layer of the support board around the registration openings, the pins are still positively retained in a precise, upright position by the resilient contact of the material in the upper section or layer of the support board. This resilient contact insures that precise registration of the photosensitive sheets and the image forming films is continuously obtained and that the pins do not fall out of the registration holes in the board during handling and copy flatening operation. The registration openings in the media sheets and image forming film may be punched-out in a single stroke of a punch into a die and the same punch and die may be used to form a punched-out registration hole in the upper, resilient layer of the support board. Because the support board has a layer of resilient material, the punched-out opening has a slightly smaller diameter than that of the pin body and this provides a continuous resilient gripping action on a registration pin when inserted.

BRIEF DESCRIPTION OF THE DRAWINGS

For a better understanding of the present invention, reference should be had to the following detailed description taken in conjunction with the drawings, in which.

DETAILED DESCRIPTION OF THE PREFERRED EMBODIMENT OF THE PRESENT INVENTION

Figure 1:
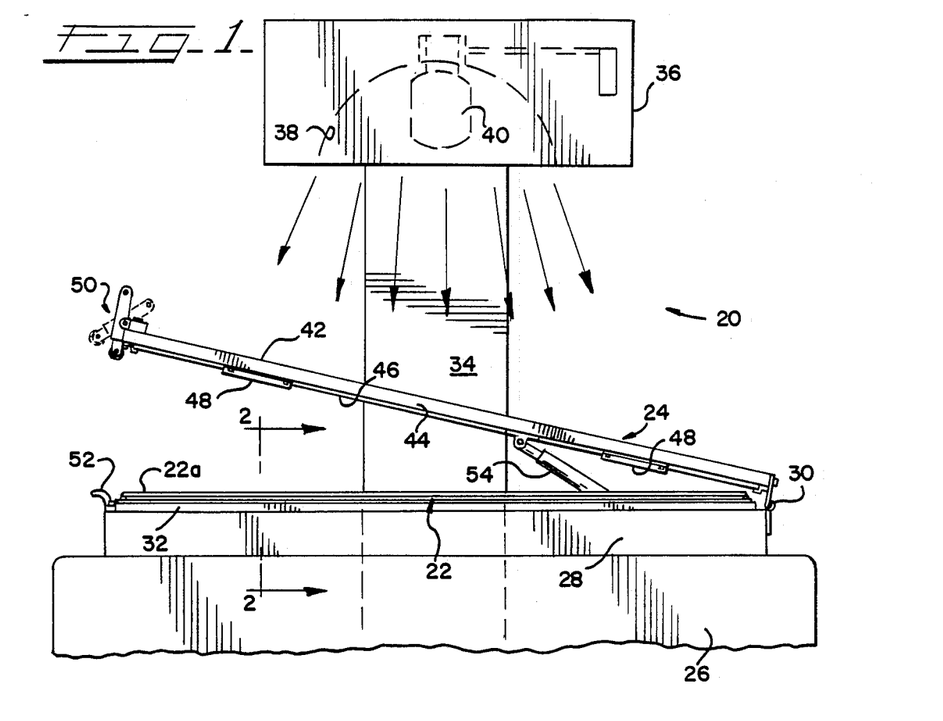
FIG. 1 is a fragmentary, side elevational view of a overhead light exposure unit employing a registration system in accordance with the features of the present invention.

Referring now more particularly to the drawings, in FIG. 1 is illustrated a new and improved overhead type, light exposure unit 20 constructed in accordance with the features of the present invention and employing a vacuum blanket 22, preferably of the fast draw-down type as shown and described in copending U.S. patent application Ser. No. 353,055, filed May 17, 1989 assigned to the same assignee as the present application and incorporated herein by reference. The vacuum blanket 22 is used in connection with a vacuum frame assembly and latch system 24, preferably of the type shown and described in copending U.S. patent application Ser. No. 369,334, filed June 21, 1989, assigned to the same assignee as the present application and also incorporated herein by reference.

Figure 2:
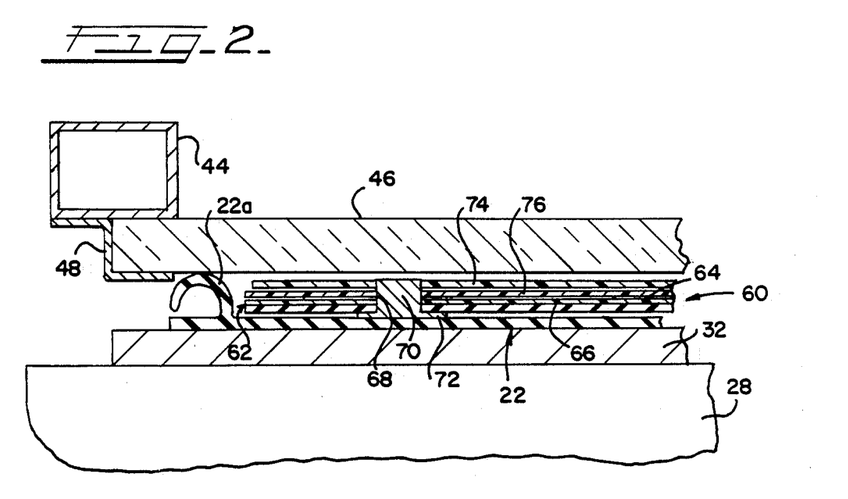
FIG. 2 is an enlarged, fragmentary, cross-sectional view taken substantially along lines 2—2 of FIG. 1.
Figure 3:
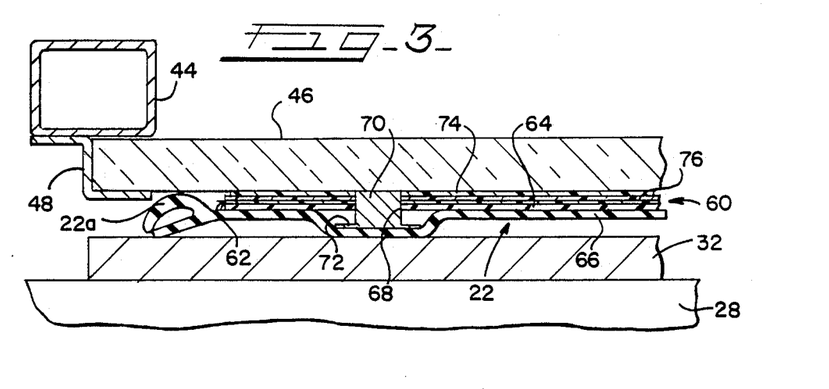
FIG. 3 is a cross-sectional view similar to FIG. 2 illustrating the registration system of the present invention in another operative position.

The overhead exposure unit 20 includes a base 26 and a frame 28 mounted on the base for pivotally supporting the vacuum frame assembly and latch system 24 by means of a plurality of hinges 30 mounted along the back side of a glass frame 42 of the vacuum frame assembly and the base frame 28. The base frame 28 supports a flat, relatively stiff, plate or table-like board 32 which functions as a work surface and which supports the vacuum blanket assembly 22 as illustrated in FIGS. 1, 2 and 3. The overhead exposure unit 10 also includes an upstanding pair of vertical side support members 34 projecting upwardly from opposite sides of the base 26 for supporting a lamp unit 36 which includes an overhead reflector 38 for focusing and directing rays of light downwardly in a controlled manner from a source of illumination such as a high intensity lamp 40 used for the reproduction of images through the film images onto sheets of photosensitive material.

As more fully described in the aforementioned copending U.S. patent application Ser. No. 369,334, the vacuum frame assembly and latch assembly 24 includes a large rectangular glass frame 42 formed with elongated, tubular side members 44 and the glass frame 42 in turn supports a sheet of glass or transparent plastic 46 secured to the frame by a plurality of Z-shaped clips 48 as shown in FIGS. 2 and 3. The vacuum frame and latch assembly 24 also includes a latch assembly 50 mounted on a front member 44 of the vacuum frame 42 and the latch assembly 50 is adapted to latchingly engage a strike member 52 mounted on the base frame 28 in a manner fully described in the aforementioned U.S. copending Patent application.

A plurality of air spring 54 are provided to support the vacuum frame assembly 24 when in an open position as shown in FIG. 1 and these air springs are compressed and shortened in length when the vacuum frame assembly is closed and latched with the glass plate 46 maintained in close parallel relationship to the board 32 as shown in FIGS. 2 and 3.

The vacuum blanket 22 includes a flexible outer sealing lip 22a extending around the outer periphery of the flexible vacuum blanket and the sealing lip is adapted to sealingly engage the underside of the glass plate 46 in a closed position as in FIGS. 2 and 3 to provide a peripheral vacuum seal around the edges of the flexible blanket vacuum blanket. When peripheral sealing is accomplished, a vacuum is drawn between the upper surface of the vacuum blanket 22 and the lower surface of the glass plate 46 as described in the afomentioned U.S. patent application Ser. No. 353,055 filed, May 17, 1989.

In accordance with the present invention, a new and improved registration system 60 is incorporated into the overhead exposure unit 20 for use with the vacuum blanket 22 and the vacuum frame assembly and latch assembly 24. The registration system 60 includes a thin, relatively stiff, flat support or "Carlson" type board 62 placed in overlying position above the vacuum blanket 22 and below a plurality of media sheets 74 and 76 as shown in FIGS. 2 and 3. The support board 62 is preferably formed with an upper layer or section 64 of relatively thin, resilient or elastomeric sheet material such as natural or synthetic rubber. The upper layer 64 is laminated to a relatively stiff or rigid, dimensionally stable, lower layer 66 formed of thin sheet material such as polyvinylchloride (PVC) or the like, which material is somewhat flexible but much less resilient than the upper layer 64.

For example, the upper sheet 64 of the support board 62 may comprise a sheet of "elastomeric" material such as rubber having a thickness range of 10 to 30 thousandths of an inch and a "DUROMETER" hardness number in a range of 40 to 60. The lower layer 66 of the support board 62 may have a nominal thickness of 25 to 50 thousandths of an inch and a "DUROMETER" hardness number in a range of 50 to 90. After the upper layer 64 and lower layer 66 are permanently bonded and laminated together, a relatively stiff, thin, flat, support board 62 results having a relatively elastic upper layer or surface segment and a relatively stiff or rigid, lower layer or segment to provide needed dimensional stability for the board overall when placed on the flexible vacuum blanket 22.

The support board 62 has one or more punched-out registration openings or holes 68 for accommodating metal registration pins 70 inserted therein to provide precisely located pins for insuring accurate registration between successive film media sheets placed on the board for copy making and platemaking operations.

Figure 4:
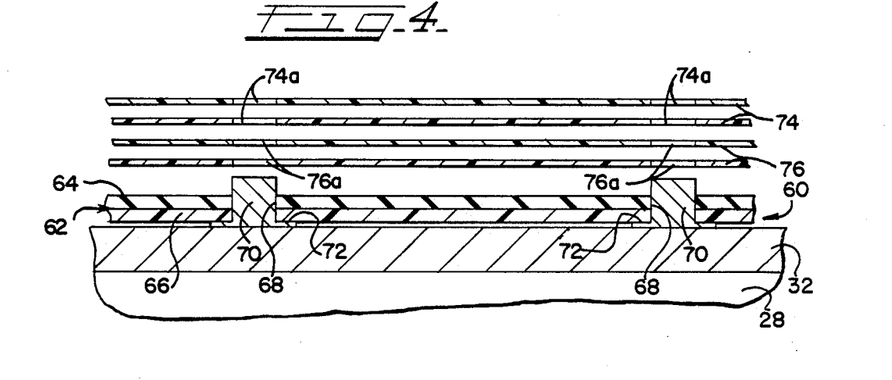
FIG. 4 is an enlarged, fragmentary, transverse cross-sectional view similar to FIGS. 2 and 3 illustrating a plurality of photosensitive sheets and image forming films in position ready for precise registration in accordance with the present invention.
Figure 5:
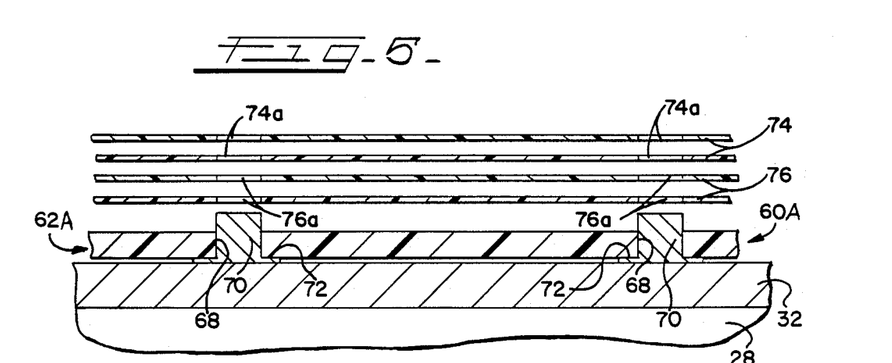
FIG. 5 is a englarged, fragmentary transverse cross-sectional view of another embodiment of a registration system in accordance with the present invention.
Figure 6:
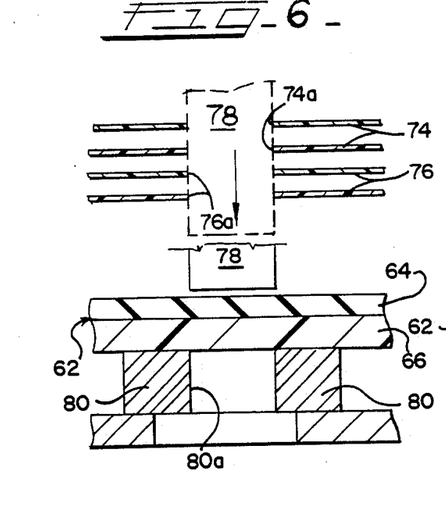
FIG. 6 is an enlarged, fragmentary, cross-sectional view of a punch and die mechanism used for punching registration openings in photosensitive sheets, image forming films and a support board in accordance with the present invention.

The pins 70 have a radial stop flange 72 at the lower end adapted to engage the underside of the support board 62 to limit upward travel of the pins after insertion in a registration opening 68 as best shown in FIGS. 2, 4 and 5.

Each registration pin 70 has an upwardly extending, cylindrical body having a short length above the stop flange 72 which is greater than the combined thickness of the support board 62 and the film sheets to be registered thereon. This insures that an upper end portion of the pin body will project a short distance above the upper surface of the support board 62 when a pin 70 is fully inserted into a registration hole or opening 68 with the stop flange 72 engaging the underside of the support board 62 as shown in FIGS. 2, 4 and 5.

The projecting upper end portion of the registration pin 70 provides a locating pin for insuring precision registration between one or more overlaying sheets of imaging forming film 74 and one or more sheets of photosensitive film material 76 during exposure to controlled light which passes downwardly from the high intensity lamp 40 through the glass plate 46.

Figure 11:
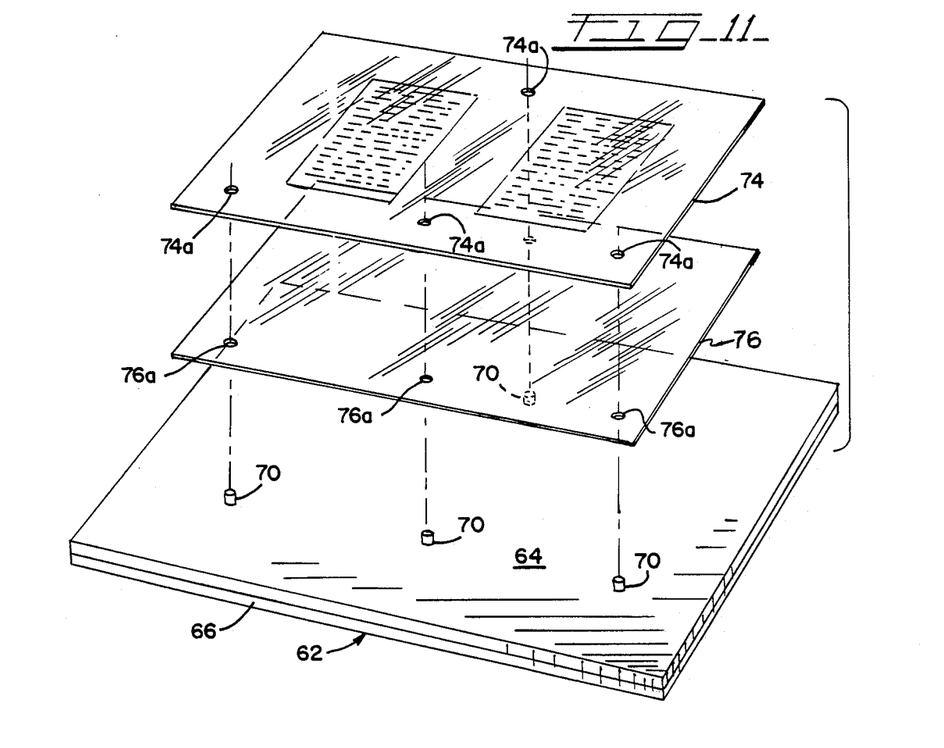
FIG. 11 is a frontal, top perspective view of a support board of the registration system in accordance with the present invention and illustrating the alignment of a plurality of simultaneously punched-out registration holes formed in a photosensitive sheet and an image forming film ready for positioning on a support board in precise registration for image reproduction.

The film sheets 74 are provided with one or more punched-out, registration openings 74a and the underlying photosensitive film sheets 76 are similarly provided with one or more punched-out registration openings 76a adapted to be aligned in coaxial alignment with each registration pin 70 mounted in the support board 62 as shown best in FIG. 11.

In order to provide a true and precise registration between image forming film sheets 74 and overlaying photosensitive sheets 76 that are successively placed and mounted on the support board 62 during photocopying or platemaking operations, it is desirable that the registration apertures 74a and 76a be formed or punched-out with a punch 78 and die 80 and the same punch and die can be used for punching-out the registration openings 68 in the support board. This important feature of the present invention is readily accommodated by the registration system 60.

Referring specifically to FIGS. 6, 7, 8 and 9, an overhead type cylindrical punch 78 having a diameter approximately equal to the diameter of the body of a registration pin 70 is movable downwardly along a center line axis to pass through one or more film sheets 74 and one or more photosensitive sheets 76 and form the respective punched-out registration openings 74a and 76a in precise coaxial alignment.

The same punch 78 and die 80 may be used in a separate operation for punching out the registration openings 68 in the support board 62 for the pins 70. The support board 62 is thereby customized to match the film and sheets that are punched-out with a particular precision punch 78 and die 80. The elastomeric pin holding feature allows the board 62 to be used for a large number of printing exposures before it must be replaced, whereas a standard "Carlson" board usually wears out more quickly. The system 60 provides major advantages over prior art boards, particularly boards using collapsible type pins, which sometimes require that the board and the punch be purchased together as a matched set. Secondly, a thin board 62 as distinguished from a conventional, thicker, prior art type "Carlson" board works much better with a fast drawdown type vacuum blanket system of the type shown and described in the copending U.S. patent application Ser. No. 353,055.

Figure 7:
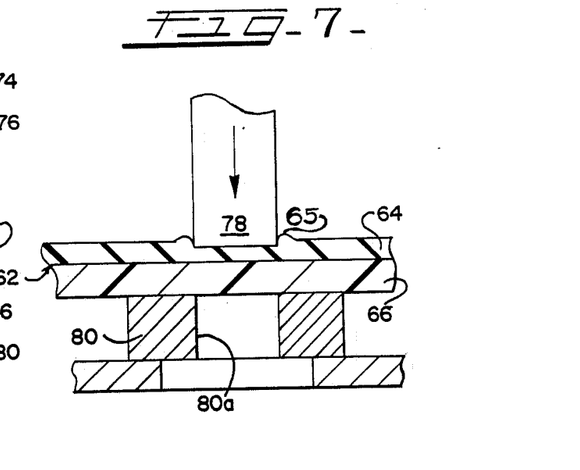
FIG. 7 is a view generally similar to FIG. 6 but illustrating the punch in an operative position during initial engagement with a support board of the registration system of the invention.

Downward travel causes the punch 78 to initially engage the resilient upper layer 64 of the support board 62 as shown in FIG. 7, but because the upper layer 64 of the board is resilient, a displaced annular ring of resilient material 65 is formed around the outer surface of the punch 78 as downward travel continues. The resilient material directly below the flat, lower end of the punch 78 is stretched out thin as illustrated, and further downward movement of the punch into the lower, more rigid layer 66 of the support board 62 causes a circular disc 64b to be sheared or punched-out of the upper layer 64. After the disc 64b is severed from the upper layer 64, the punch 78 continues downwardly and punches out a similar, but slightly larger in diameter circular disc 66b out of the lower layer 66 of the board 62. The punch-out operation is completed as the lower face of the punch 78 moves into the annular die 80 having a central opening 80a slightly larger than the outer diameter of the punch 78.

Figure 8:
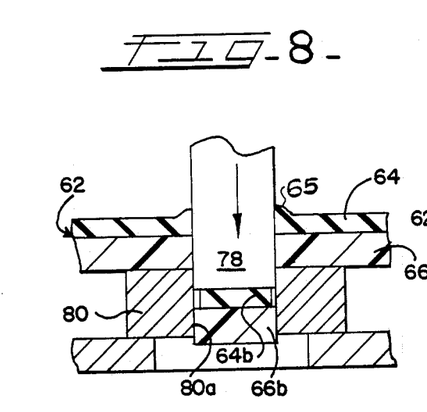
FIG. 8 is another, enlarged, cross-sectional view of the punch and die system similar to FIG. 7 but illustrating the punch in a further displaced operating position on a punching stroke after a registration opening has been punched-out of the support board.
Figure 9:
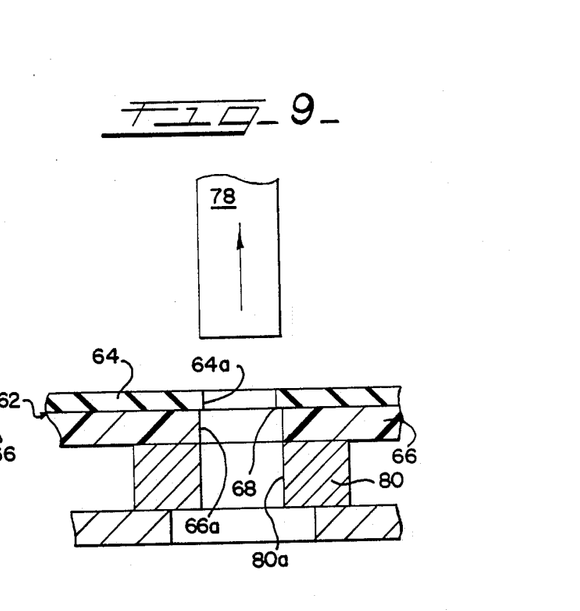
FIG. 9 is a similar, cross-sectional view illustrating the support board of the registration system after the punch has been withdrawn showing a finished registration opening formed in the board.

As shown in FIG. 8, when the punch 78 passes into the die 80 below the lower underside of the support board 62, the circular or punched out discs 64b and 66b are pushed downwardly and out of the opening 80a in the die. The circular disc 64b punched-out of the resilient, upper board layer 64 contracts after punch-out is completed to an unstressed diameter that is less than the nominal diameter of the punch 78 as shown in FIG. 8, whereas the punched out disc 66b from the stiffer, lower layer 66 has a slightly larger diameter which is nominally equal to that of the punch 78. The net result is the formation of an aperture 68 in the support board 62 which has an upper segment with a diameter that is slightly less than the diameter of the punch 78 and the registration pin 70 formed in the upper layer 64 (as designated by the numeral 64a) and a somewhat larger diameter segment in the more rigid layer 66 (as designated by the numeral 66a) which has a diameter substantially equal to that of the registration pin 70. This arrangement results in a registration pin 70 being firmly secured in the support board 62 by the resilient upper layer 64 even though the pin itself may wear somewhat after extended usage and even though the more rigid lower layer 66 of the board 62 may become worn around the edge of a registration opening and expand or increase the hole diameter 66a.

The support board 62 thus has a registration hole 68 for accomodating the registration pin 70 that is stepped in diameter even though the hole is formed in a single downward stroke of the punch 78 into the aperture 80a of the donut-shaped die 80. This arrangement insures (1) that the pins 70 do not fall out of the board 62, even after extended wear and usage and (2) that the pins 70 generally remain firmly and resiliently gripped by the resilient material of the upper layer 64 and do not tilt to one side or the other but instead remain straight-up or generally perpendicular to the upper surface of the resilient upper layer 64 of the support board 62 when the lower stop flange 72 of the pin 70 is pressed against the underside of the support board. Moreover, when punching operations are commenced, precise registration can be readily achieved because the image forming films 74 and the photosensitive sheets 76, are punched out by the same punch 78 and die 80 used to punch-out openings 68 in the support board 62 itself.

Figure 10:
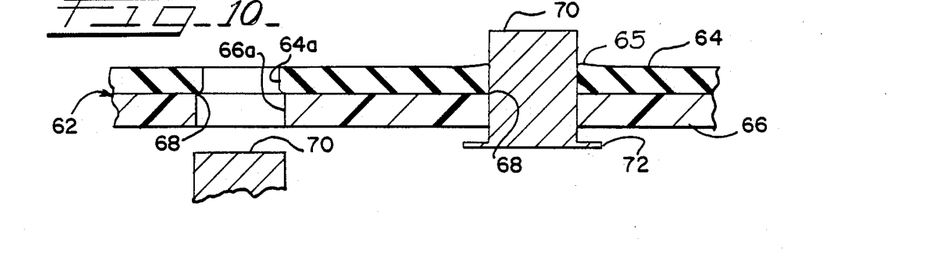
FIG. 10 is a large, fragmentary, transverse cross-sectional view illustrating a support board having a punched out registration opening and a registration pin inserted ready for engagement with a photosensitive sheet and image forming film.
Figure 10A:
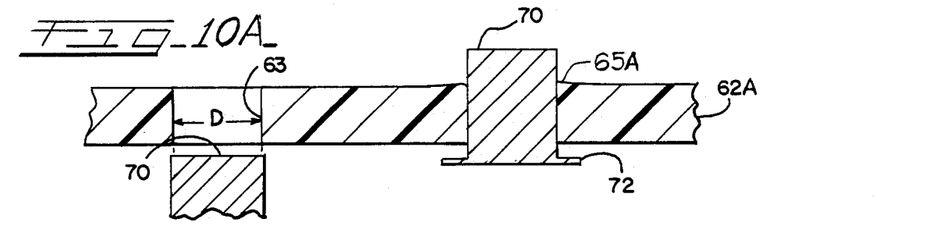
FIG. 10A is an enlarged, fragmentary, transverse cross-sectional view similar to FIG. 10 but illustrating a support board of the registration system of the type illustrated in FIG. 5.

Referring now to FIGS. 5 and 10A, therein is illustrated another embodiment of a support board 62A of a registration system 60A wherein the support board 62A comprises a unitary sheet construction rather than a multiple layer, laminated support board 62 like that of the previous embodiment. The unitary support board 62A is formed of a material having an elasticity or resiliency which is slightly less than that of the upper layer 64 but greater than the rigid lower layer 66 of the support board 62 of the previous embodiment. The board 62A is formed with a punched opening 63 (FIG. 10A) which has a diameter "D" which is a slightly less than the nominal diameter of the registration pin 70 so that a slight amount of resilient compressive force is maintained on the body of the registration pins as shown in FIG. 10A as indicated by the numeral 65A. As the pins 70 begin to wear, the diameter "D" enlarges slightly until after extended usage the pins 70 may become too loose for precise registration and when this occurs replacement of the support board 62A is necessary. However, for short reproduction runs, the less expensive support board 62A is extremely cost effective. The reduced cost of the single layer support board 62A, is offset by the reduced life that is afforded by this single layer embodiment, which eliminates the need for lamination of two different types of sheet material into a composite support board.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. Apparatus for exposing a photo-sensitive sheet to light through portions of an image forming film sheet to reproduce said image on said sensitive sheet, comprising:

a support board having a flat upper surface for supporting said photo-sensitive sheet and said film sheet in overlying relation thereon and having a bottom surface, said support board having an upper layer formed of resilient material and having at least one opening extending between said surfaces for receiving a registration pin; and a registration pin, mounted in said opening of said board, having stop means adjacent a lower portion for limiting relative longitudinal movement of said pin in one direction in said opening and having an upper portion normally projecting above said upper surface of said board to extend through aligned registration openings formed in said photo-sensitive sheet and said film sheet for mounting said sheets in precise registration on said upper surface of said board, said upper portion of said pin having a transverse dimension slightly greater than an aligned transverse dimension across said opening in said board for retaining said pin in said board by compression of said resilient material around said opening against said upper portion of said pin.

2. The apparatus of claim 1, wherein:
said support board comprises a laminated board having an upper layer of resilient sheet material laminated to a lower layer of relatively stiff sheet material.

3. The apparatus of claim 2, wherein:
said upper layer comprises an elastomer having a thickness range of 0.010" to 0.030" and durometer hardness range of 40-60.

4. The apparatus of claim 2, wherein:
said upper layer comprises a sheet of natural rubber.

5. The apparatus of claim 2, wherein:

said opening in said support board comprises a punched opening of circular cross-section formed with a cylindrical punch of uniform diameter moved through said board from said flat upper surface toward said bottom surface.

6. The apparatus of claim 2, wherein:
said lower layer comprises a sheet of plastic material having a durometer hardness of 70 or greater.

7. The apparatus of claim 2, wherein:
said lower layer comprises a sheet of plastic material having a nominal thickness ranging from 0.025"–0.050".

8. The apparatus of claim 2, wherein:
said lower layer comprises a sheet of material having substantially greater dimensional stability than said sheet material of said upper layer.

9. The apparatus of claim 1, wherein:
said support board comprises a sheet of plastic material having a durometer hardness ranging from 40–90.

10. The apparatus of claim 9, wherein:
said opening in said support board comprises a punched opening of circular cross-section formed with a cylindrical punch having a uniform diameter slightly less than that of said upper portion of said registration pin.

11. The apparatus of claim 5, in combination with said photo-sensitive sheet and said film sheet, wherein:
said registration openings in said photo-sensitive sheet and said film sheet comprise punched openings formed with the same cylindrical punch used to form said opening in said board.

12. The apparatus of claim 1, wherein:
said stop means of said registration pin comprises a thin annular flange extending radially outwardly of said upper portions of said pin.

13. The apparatus of claim 12, wherein:
said upper portion of said registration pin has a length extending longitudinally upwardly of said flange that is greater than the thickness of said support board, said photo-sensitive sheet and said film sheet.

14. Apparatus for exposing a photo-sensitive sheet to light through portions of an image forming film sheet to reproduce said image, comprising:
board means having a surface for supporting said sheets overlying one another for light exposure to reproduce said image; and
at least one registration pin extendable through aligned registration holes provided in said board and said overlying sheets;
said surface of said board means comprising resilient gripping material defining said hole around said pin for resiliently gripping said pin when said pin is extended through said registration holes in said sheets and said board means for preventing said pin from falling out of said hole of said board means.

15. The apparatus of claim 14, wherein:
said registration hole in said resilient surface of said board means has a transverse dimension less than that of said pin, whenever a pin is not present in said hole.

16. The apparatus of claim 15, wherein:
said board means comprises a sheet of resilient material laminated to a sheet of relatively stiff material.

17. The apparatus of claim 14, wherein:
said registration pin includes stop means engageable with said board means for limiting relative longitudinal movement of said pin in one direction when said pin is present in said registration hole of said board means.

18. The apparatus of claim 17, wherein:
said stop means includes radial flange means engageable with said board means around said registration hole when said pin is moved in said one direction.

19. The apparatus of claim 16, wherein:
said registration hole in said board means has a transverse dimension in said resilient material that is less than in said stiff material.

20. The apparatus of claim 19, wherein:
said transverse dimension of said registration hole in said relatively stiff material is substantially the same as that of said pin.

21. Apparatus for exposing a photo-sensitive sheet to light through portions of an image forming film sheet to reproduce said image on said sensitive sheet, comprising:
a support board having a flat upper surface for supporting said photo-sensitive sheet and said film sheet in overlying relation thereon and having a bottom surface, said support board having an upper layer formed of resilient sheet material comprising an elastomer having a thickness range of 0.010" to 0.030" and a durometer hardness range of 40–60 and laminated to a lower layer of relatively stiff sheet material and having at least one opening extending between said surfaces for receiving a registration pin; and
a registration pin, mounted in said opening of said board, having stop means adjacent a lower portion for limiting relative longitudinal movement of said pin in one direction in said opening and having an upper portion normally projecting above said upper surface of said board to extend through aligned registration openings formed in said photo-sensitive sheet and said film sheet for mounting said sheets in precise registration on said upper surface of said board, said upper portion of said pin having a transverse dimension slightly greater than an aligned transverse dimension across said opening in said board for retaining said pin in said board by compression of said resilient material around said opening against said upper portion of said pin.

22. Apparatus for exposing a photo-sensitive sheet to light through portions of an image forming film sheet to reproduce said image on said sensitive sheet, comprising:
a support board having a flat upper surface for supporting said photo-sensitive sheet and said film sheet in overlying relation thereon and having a bottom surface, said support board having an upper layer formed of resilient sheet material comprising a sheet of natural rubber and laminated to a lower layer of relatively stiff sheet material, and having at least one opening extending between said surfaces for receiving a registration pin; and
a registration pin, mounted in said opening of said board, having stop means adjacent a lower portion for limiting relative longitudinal movement of said pin in one direction in said opening and having an upper portion normally projecting above said upper surface of said board to extend through aligned registration openings formed in said photo-sensitive sheet and said film sheet for mounting said sheets in precise registration on said upper surface of said board, said upper portion of said pin having a transverse dimension slightly greater than an aligned transverse dimension across said opening in said board for retaining said pin in said board by compression of said resilient material around said opening against said upper portion of said pin.

23. Apparatus for exposing a photo-sensitive sheet to light through portions of an image forming film sheet to reproduce said image on said sensitive sheet, comprising:

a support board having a flat upper surface for supporting said photo-sensitive sheet and said film sheet in overlying relation thereon and having a bottom surface, said support board having an upper layer formed of resilient sheet material laminated to a lower layer of relatively stiff sheet material, and having at least one opening extending between said surfaces for receiving a registration pin, said opening in said support board comprising a punched opening of circular cross-section formed with a cylindrical punch of uniform diameter moved through said board from said flat upper surface toward said bottom surface; and a registration pin, mounted in said opening of said board, having stop means adjacent a lower portion for limiting relative longitudinal movement of said pin in one direction in said opening and having an upper portion normally projecting above said upper surface of said board to extend through aligned registration openings formed in said photo-sensitive sheet and said film sheet for mounting said sheets in precise registration on said upper surface of said board, said upper portion of said pin having a transverse dimension slightly greater than an aligned transverse dimension across said opening in said board for retaining said pin in said board by compression of said resilient material around said opening against said upper portion of said pin.

24. The apparatus of claim 23, in combination with said photo-sensitive sheet and said film sheet, wherein:
said registration openings in said photo-sensitive sheet and said film sheet comprise punched openings formed with the same cylindrical punch used to form said opening in said board.

25. Apparatus for exposing a photo-sensitive sheet to light through portions of an image forming film sheet to reproduce said image on said sensitive sheet, comprising:

a support board having a flat upper surface for supporting said photo-sensitive sheet and said film sheet in overlying relation thereon and having a bottom surface, said support board having an upper layer formed of resilient sheet material and laminated to a lower layer of relatively stiff sheet material comprising a sheet of plastic material having a durometer hardness of 70 or greater, and having at least one opening extending between said surfaces for receiving a registration pin; and a registration pin, mounted in said opening of said board, having stop means adjacent a lower portion for limiting relative longitudinal movement of said pin in one direction in said opening and having an upper portion normally projecting above said upper surface of said board to extend through aligned registration openings formed in said photo-sensitive sheet and said film sheet for mounting said sheets in precise registration on said upper surface of said board, said upper portion of said pin having a transverse dimension slightly greater than an aligned transverse dimension across said opening in said board for retaining said pin in said board by compression of said resilient material around said opening against said upper portion of said pin.

26. Apparatus for exposing a photo-sensitive sheet to light through portions of an image forming film sheet to reproduce said image on said sensitive sheet, comprising:

a support board having a flat upper surface for supporting said photo-sensitive sheet and said film sheet in overlying relation thereon and having a bottom surface, said support board having an upper layer formed of resilient sheet material and laminated to a lower layer of relatively stiff sheet material comprising a sheet of plastic material having a nominal thickness ranging from 0.025"–0.050", and having at least one opening extending between said surfaces for receiving a registration pin; and a registration pin, mounted in said opening of said board, having stop means adjacent a lower portion for limiting relative longitudinal movement of said pin in one direction in said opening and having an upper portion normally projecting above said upper surface of said board to extend through aligned registration openings formed in said photo-sensitive sheet and said film sheet for mounting said sheets in precise registration on said upper surface of said board, said upper portion of said pin having a transverse dimension slightly greater than an aligned transverse dimension across said opening in said board for retaining said pin in said board by compression of said resilient material around said opening against said upper portion of said pin.

27. Apparatus for exposing a photo-sensitive sheet to light through portions of an image forming film sheet to reproduce said image on said sensitive sheet, comprising:

a support board comprising a sheet of plastic material having a durometer hardness ranging from 40–90, having a flat upper surface for supporting said photo-sensitive sheet and said film sheet in overlying relation thereon and having a bottom surface, said support board having an upper layer formed of resilient sheet material comprising a sheet of plastic material and having at least one opening extending between said surfaces for receiving a registration pin; and a registration pin, mounted in said opening of said board, having stop means adjacent a lower portion for limiting relative longitudinal movement of said pin in one direction in said opening and having an upper portion normally projecting above said upper surface of said board to extend through aligned registration openings formed in said photo-sensitive sheet and said film sheet for mounting said sheets in precise registration on said upper surface of said board, said upper portion of said pin having a transverse dimension slightly greater than an aligned transverse dimension across said opening in said board for retaining said pin in said board by compression of said resilient material around said opening against said upper portion of said pin.

28. The apparatus of claim 23, wherein:
said opening in said support board comprises a punched opening of circular cross-section formed with a cylindrical punch having a uniform diameter slightly less than that of said upper portion of said registration pin.

* * * * *